United States Patent [19]
Maezawa

[11] 4,080,982
[45] Mar. 28, 1978

[54] SLEEVE VALVE
[75] Inventor: Keiji Maezawa, Tokyo, Japan
[73] Assignee: Maezawa Industrial Incorporated, Tokyo, Japan
[21] Appl. No.: 715,347
[22] Filed: Aug. 17, 1976
[30] Foreign Application Priority Data
  Sep. 2, 1975  Japan ............... 50-106169
  Sep. 2, 1975  Japan ............... 50-120803[U]
[51] Int. Cl.² ............................................. F16K 13/00
[52] U.S. Cl. ................................. 137/219; 137/625.3
[58] Field of Search ............................. 137/219–222, 137/625.3, 625.33

[56] References Cited
U.S. PATENT DOCUMENTS
3,605,787  9/1971  Krogfoss ............................. 137/219
3,665,964  5/1972  Brown ............................. 137/625.3 X

FOREIGN PATENT DOCUMENTS
236,928  6/1969  U.S.S.R. ......................... 137/625.33

Primary Examiner—Robert G. Nilson
Attorney, Agent, or Firm—William Anthony Drucker

[57] ABSTRACT

A sleeve valve for pipelines has a fixed sleeve with inlet end open and outlet end closed, and openings in its side wall. A movable sleeve open at both ends is slidable in the fixed sleeve to open and close the openings. The improvement is that the inner sleeve also has openings in its side wall, and one or more ring-shaped partition plates are disposed at substantially equal intervals between the outer wall of the movable sleeve, and the inner wall of the fixed sleeve.

21 Claims, 12 Drawing Figures

OPENING RATE  $\gamma = 39\%$

$$d_1 = \frac{\tan\theta \times \pi \times d}{2}$$

$d_2 = d_1 + 1/5 \text{ TAPER}$

SLEEVE VALVE

BACKGROUND OF THE INVENTION

The present invention relates to an improved sleeve valve adapted to control the flow and pressure of fluid such as water in any pipeline section for the fluid.

Prior art flow and pressure control valves for fluid such as water are exemplified by sluice and butterfly valves. However, these sluice and butterfly valves each have the drawback that they can not attain an excellent flow and pressure control because the configuration of fluid flow changes with the extent of the valve opening, and more particularly that it developes the so-called cavitation over its valve opening range less than about 30% because it has a relatively high cavitation index (see FIG. 6), producing a relatively large noise and vibration.

Under these circumstances, a sleeve valve of the hereinunder described construction has been recently developed by the U.S. Bureau of Reclamation. Namely, the sleeve valve comprises a fixed sleeve which has a cylindrical hollow shape with its lower end closed and in the peripheral wall of which a plurality of small taper holes with mutually equal diameters made gradually smaller from its inner wall toward its outer wall are spirally perforated at a substantially equal pitch interval, the fixed sleeve having its open upper end coaxially joined, in a deenergizing tank or tub having its upper wall to which the end of a fluid inflow pipe forming a fluid inlet port for the tank is vertically joined and provided at its predetermined side wall portion with a fluid outflow or overflow aperture, to the end of said fluid inflow pipe; and a movable sleeve engaged with the fixed sleeve so as slidably to move along the inner wall thereof in the upper and lower directions.

The sleeve valve of the above-mentioned construction has its advantage enabling its cavitation index (see FIG. 6) to be set at a smaller value than those of the aforesaid sluice and butterfly valves and consequently preventing cavitation from being produced over its valve opening range more than about 10%, because the configuration of fluid flow is always kept in a circular form without change.

Figure 9:
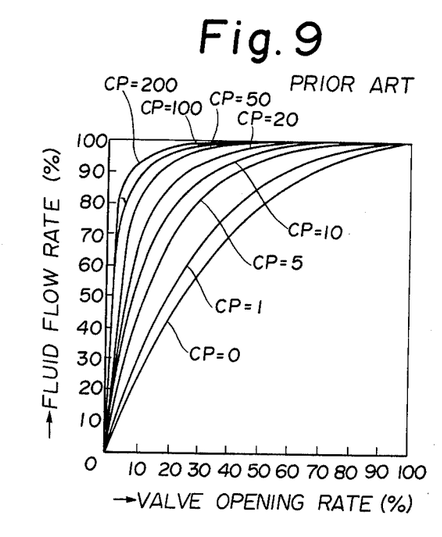
FIG. 9 shows curve diagrams illustrating the relationship of the valve opening rate versus the fluid flow rate where the prior art sleeve valve is installed in various fluid pipeline sections having different coefficients of pipe loss.

However, the above-mentioned prior art sleeve valve has drawbacks as hereinunder enumerated:

(1) It still produces cavitation over its valve opening range less than about 10%; and (2) When it is disposed in a fluid pipeline section adjacent to the headwaters such as a dam where the coefficient of pipe loss is almost zero, then it can control to obtain its fluid flow rate substantially proportional to the extent of the moving stroke of the movable sleeve over the whole of the moving stroke thereof, but, when it is installed in a fluid pipeline section considerably remote from the headwaters where the coefficient of pipe loss has a considerably large value, then the greater amount of the whole of the fluid flow to be controlled by the sleeve valve passes therethrough in a considerably smaller valve opening position and consequently the amount of fluid flow to be passed therethrough almost does not change over the large remaining valve opening range (see FIG. 9).

It is therefore the object of the invention to provide a novel sleeve valve enabling its cavitation index at its initial valve opening portion to be set at a smaller value than that of the prior art sleeve valve, and capable of attaining the most excellent possible flow control over the whole of the valve opening range even if it is disposed in a pipeline section where the coefficient of pipe loss has a considerably large value.

SUMMARY OF THE INVENTION

In a sleeve valve adapted to control the flow and pressure of fluid in a predetermined midsection of a fluid pipeline by selectively closing a plurality of holes or openings bored in the peripheral wall of a fixed sleeve which has a cylindrical hollow shape with its inlet end opened and its outlet end closed in accordance with the reciprocation of a movable sleeve having a cylindrical hollow shape with its inlet and outlet opened and engaged with the fixed sleeve so as slidably to move along the length thereof, the sleeve valve according to the invention is characterized by providing an inner sleeve, disposed within the outlet side of the fixed sleeve coaxially therewith, which has a cylindrical hollow shape with its inlet end open and in the peripheral wall of which a plurality of holes similar to those bored in that peripheral wall portion of the fixed sleeve which faces the inner sleeve are perforated, one or more ring shaped partition plates being disposed at a substantially equal interval between the outer peripheral wall of the inner sleeve and that inner peripheral wall of the fixed sleeve which faces the inner sleeve.

The sleeve valve of the above-mentioned construction has the advantage of enabling its cavitation index at its initial valve opening section to be set at a smaller value than that of the prior art sleeve valve.

According to a preferred embodiment of the invention, the plurality of holes bored in the peripheral wall of the fixed sleeve are so formed that their total opening area per unit length at its inlet end side has a larger value than that at the remaining fixed sleeve portion, whereby the sleeve valve has the advantage of being capable of attaining the most excellent possible flow control over the whole of the valve opening range even where it is installed in a fluid pipeline section having a considerably high coefficient of pipe loss as well as where it is positioned in a fluid pipeline section having a relatively low coefficient of pipe loss.

BRIEF DESCRIPTION OF THE INVENTION

The invention can be more fully understood from the following detailed description when taken in conjunction with the accompanying drawings, in which.

PREFERRED EMBODIMENTS OF THE INVENTION

Figure 1:
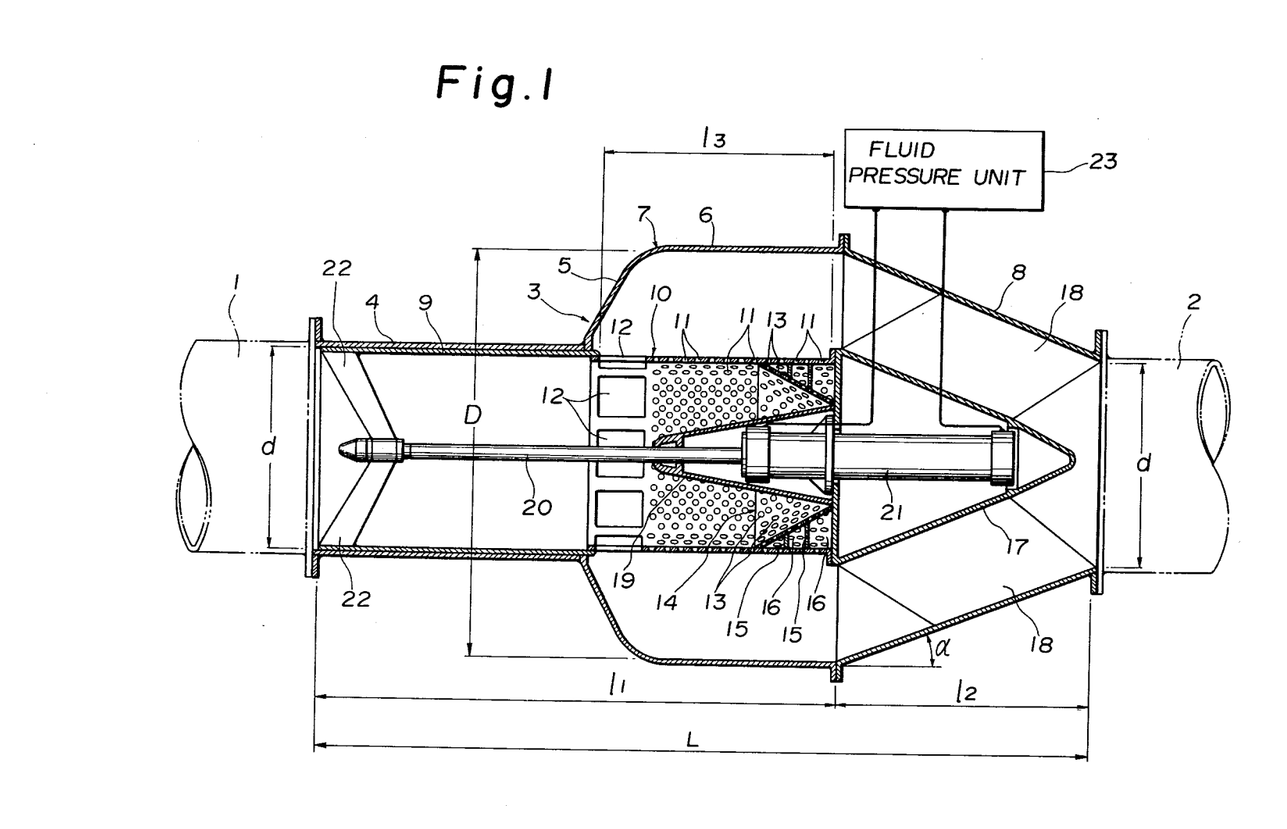
FIG. 1 is a schematic cross sectional view of a fluid pipeline section arranged utilizing a sleeve valve in accordance with one embodiment of the invention.
Figure 2:
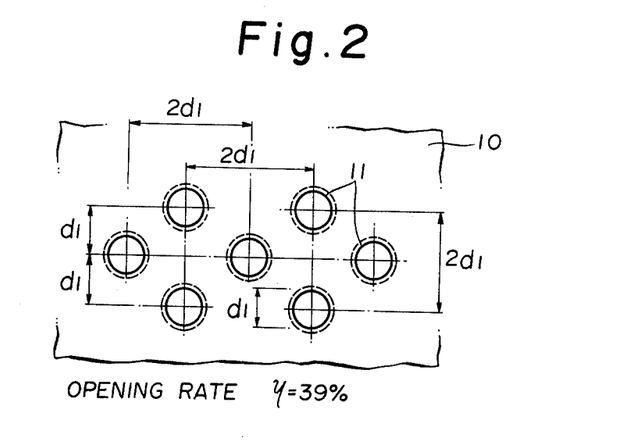
FIGS. 2 and 3 respectively are schematic developed views of the outlet side of the fixed sleeve shown in FIG. 1, illustrated for explaining the method of forming the respective small holes to be bored therein.

In FIG. 1, reference numerals 1 and 2 shown by phantoms respectively denote a fluid inlet pipe forming an inflow port for fluid to be flow and pressure controlled by a sleeve valve according to the invention in the hereinafter described manner, and a fluid outlet pipe for the fluid after its flow and pressure have been controlled by the sleeve valve.

Thus, the sleeve valve according to the invention is installed within a valve housing 3 having the hereinunder described construction and joined between the inlet pipe 1 and outlet pipe 2.

Namely, the valve housing 3 comprises a guide pipe 4 having a cylindrical hollow shape with both ends opened and having one end joined to the inlet pipe 1; a deenergizing tank 7 having substantially the same length as the hereinunder described fixed sleeve 10 and, including a cup shaped section 5 the ring shaped bottom edge of which is joined to the other end of the guide tube 4 and a cylindrical section 6 formed integral with the cup shaped section and having one end projected from the upper edge of the cup shaped section 5 toward the outlet pipe 2; and a one-way sloped pipe 8 having a truncated conical hollow shape with its bottom edge joined to the other end of the cylindrical section 6 of the deenergizing tank 7 and with its upper edge joined to the outlet pipe 2. The guide pipe 4 of the valve housing 3 is so formed as to have its nominal diameter substantially equal to each inner diameter of the inlet and outlet pipes 1 and 2 and its length slightly longer than the fixed sleeve 10.

A movable sleeve 9 having a cylindrical hollow shape wih both ends opened is so disposed within the guide pipe 4 as slidably to reciprocate along its length by the stroke substantially equal to the length $l_3$ of the fixed sleeve 10 for the purpose of selectively closing whole the outer peripheral wall of the fixed sleeve 10 in the hereinafter described manner. The fixed sleeve 10 having a cylindrical hollow shape with the inlet pipe side end opened is coaxially arranged within the deenergizing tank 7 of the valve housing 3. The fixed sleeve 10 is so formed as to have a slightly shorter length $l_3$ than the movable sleeve 9 and a slightly smaller diameter than it.

Thus, a plurality of small apertures or holes 11 having substantially the same dimensions as each other are perforated at a substantially equal pitch interval in that peripheral wall portion of the fixed sleeve 10 which has about 70% length of the whole length $l_3$ thereof starting from the outlet pipe side end, and one or more large openings or windows 12 having, e.g., a rectangular shape and a fully larger dimension than each of the small holes 11 are so bored in the remaining peripheral wall portion of the fixed sleeve 10 having about 30% length of the whole of the length thereof that their outer surface total opening area has substantially the same value as that of the respective small holes 11. Accordingly the outer surface total opening area of the windows 12 per unit length of the fixed sleeve 10 has a larger value than the outer surface total opening area of the holes 11 per unit length of the fixed sleeve.

The large opening 12 may be formed by the space defined by the rear or inlet pipe side edge of the fixed sleeve 10 and the front or outlet pipe side edge of the movable sleeve 9.

Figure 3:
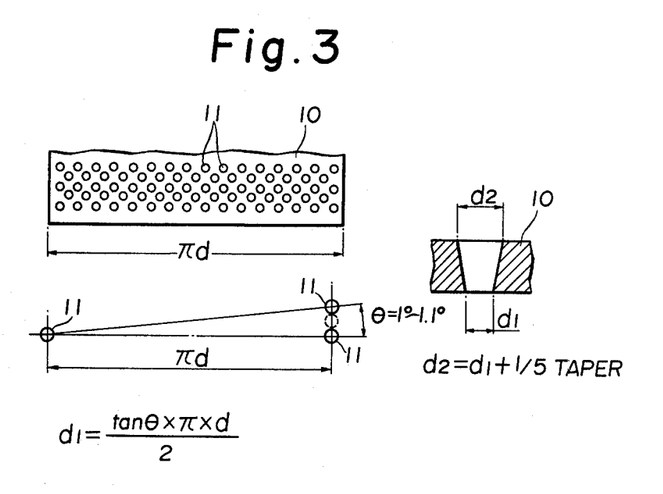

In this case, it is preferable that each of the respective small holes 11 is perforated in a taper shape having a diameter made gradually smaller from the inner wall surface of the fixed sleeve 10 toward the outer wall surface thereof in order to make the frictional resistance of fluid passing through each hole 11 as small as possible, and that the respective small holes 11 are perforated in a zigzag form at a pitch interval equal to about twice the diameter $d_1$ of each small hole 11 on the outer wall of the fixed sleeve 10 in order to make the opening ratio (in this example, $y = 39\%$) of the fixed sleeve 10 as large as possible and in consequence to make the loss of flow passing through each hole 11 as small as possible (see FIG. 3).

When, thus, the pitch angle of the respective small holes 11 is $\theta$ (in this example, $\theta = 1° \sim 1°1'$) as shown in FIG. 3, then the diameter $d_1$ of each small hole 11 on the outer surface of the fixed sleeve 10 is determined by an equation $d_1 = (\tan \theta \cdot \pi d)/2$, and has a value as shown in the below table in accordance with the nominal diameter $d$ of the valve housing 3 defined in this example by the inner diameter of the guide pipe 4.

Table 1

| d (mm) | $d_1$(mm) | d (mm) | $d_1$(mm) | d (mm) | $d_1$(mm) |
|---|---|---|---|---|---|
| 250 | 8.0 | 500 | 15.0 | 1000 | 30.0 |
| 300 | 9.0 | 600 | 18.0 | 1100 | 33.0 |
| 350 | 10.0 | 700 | 21.0 | 1200 | 36.0 |
| 400 | 12.0 | 800 | 24.0 | 1350 | 41.0 |
| 450 | 13.0 | 900 | 27.0 | 1500 | 45.0 |

On the other hand, the present inventor has experimentally proved that the taper angle (see FIG. 3) of each small hole 11 is suitable to set at about 11°30' (corresponding to 1/5 taper).

Reverting again to FIG. 1, an inner sleeve 14 (see FIG. 4) having a truncated conical hollow shape with both ends opened is so arranged within the rear or outlet pipe side end of the fixed sleeve 10 coaxially therewith that its upper circular edge is disposed at the side of the outlet pipe 2.

Figure 4:
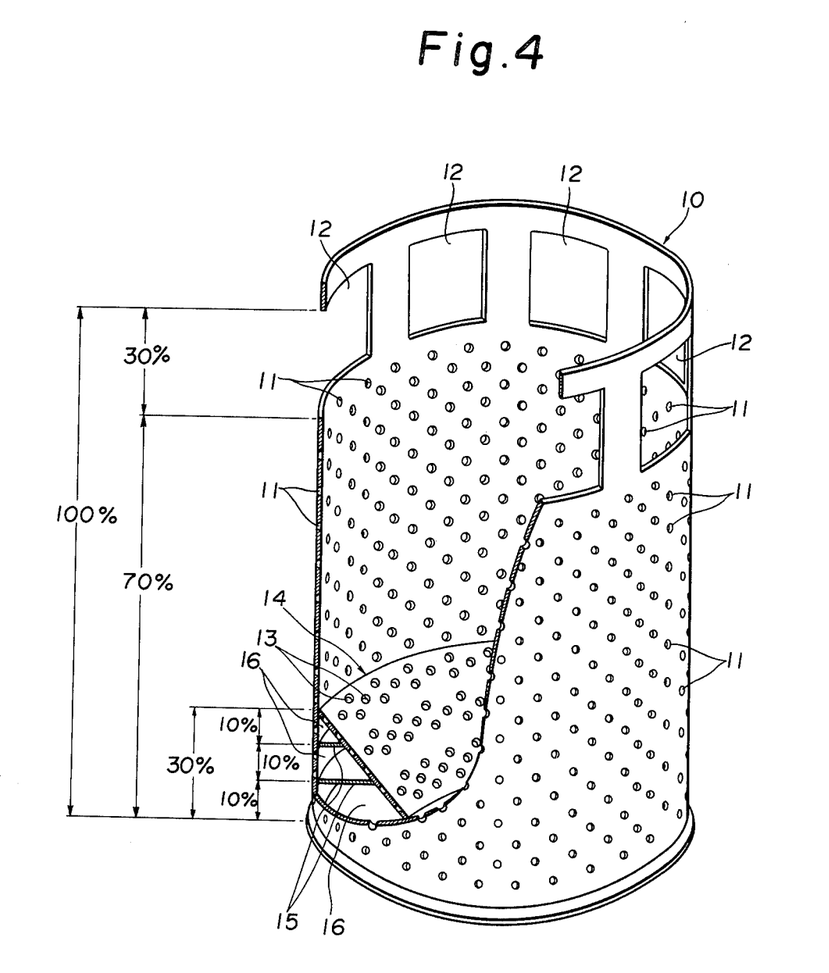
FIG. 4 is a partly broken away, enlarged perspective view of the fixed sleeve shown in FIG. 1.

The inner sleeve 14 has the length equal to about 30% of whole the length $l_3$ of the fixed sleeve 10 and in the peripheral wall of it a plurality of small taper or nozzle holes 13 substantially similar to those 11 bored in the fixed sleeve 10 are perforated. The bottom circular edge of the inner sleeve 14 formed to have an outer diameter substantially equal to the inner diameter of the fixed sleeve 10 is fixedly secured to the inner wall portion of the fixed sleeve 10 facing the inner sleeve 14. One or more (in this example, two) ring shaped partition plates 15 are arranged at a substantially equal interval between the outer peripheral wall of the inner sleeve 14 and the inner wall portion of the fixed sleeve 10 confronting the inner sleeve 14, whereby a plurality of (in this example, three) watertight compartments 16 are formed.

Thus, the inclined angle of the peripheral wall of the inner sleeve 14 is so defined that the total upper surface opening area of the respective hole 13 bored in that peripheral wall portion of the inner sleeve 14 which forms each of the compartments 16 has substantially the same value as that of the respective holes 11 bored in that peripheral wall portion of the fixed sleeve 10 which forms each corresponding compartment 16.

On the other hand, a cylinder casing 17 of a conical hollow shape is so arranged within the one-way sloped pipe 8 coaxially therewith that its top is disposed at the side of the outlet pipe 2. The ring shaped bottom edge of the casing 17 having an outer diameter substantially equal to the outer diameter of the fixed sleeve 10 is watertightly secured to the front or inlet pipe side end of the fixed sleeve 10. The casing 17 is fitted through a plurality of plates 18 to the inner wall of the one-way sloped tube 8. Further, a cylinder cover 19 having a conical hollow shape and the length equal to, e.g., about 70% of the length $l_3$ of the fixed sleeve 10 is so disposed within the fixed sleeve 10 coaxially therewith that its top faces the inlet pipe 1. The bottom edge of the cover 19 is formed to have its outer diameter substantially equal to the inner diameter of the upper edge of the inner sleeve 14 and is watertightly secured together with the upper edge of the inner sleeve 14 to the ring shaped bottom surface of the caasing 17, whereby the rear or outlet pipe side end of the fixed sleeve 10 is watertightly closed.

Thus, a fluid controlled type cylinder 21 with its piston rod 20 projected watertightly from the top of the cover 19 is so arranged within the casing 17 and cover 19 as to pass through the ring shaped bottom of the casing 17 into the cover 19 and to be secured to the ring shaped bottom of the casing 17.

The projected tip portion of the piston rod 20 is fixed through a plurality of plates 22 to the front or inlet pipe side inner wall portion of the movable sleeve 9. Thus, the cylinder 21 is connected to a fluid pressure unit 23 provided at the outside of the valve housing 3 and serves appropriately to control the projecting length of the piston rod 20 by the action of the fluid pressure within the unit 23, whereby it acts to reciprocate the movable sleeve 9 between one position disposed within the guide pipe 4 with the whole of the outer peripheral wall of the fixed sleeve 10 opened (see FIG. 1) and the other position closing whole the outer peripheral wall of the fixed sleeve 10.

In this case, if the cross sectional area $(\pi/4)(D^2 - d^2)$ of the deenergizing tank 7 has not a larger value than the cross sectional area $(\pi/4) d^2$ of the nominal diameter $d$ of the valve housing 3, then a large amount of flow should be lost within the deenergizing tank 7. For this reason, the diameter D of the deenergizing tank 7 is preferable to have such a value as is given by the below equation.

$$(\pi/4)(D^2 - d^2) \geq (\pi/4) d^2 \quad (1)$$

From the above equation (1), $$D \geq \sqrt{2d^2} \geq 1.414\, d \quad (2)$$

Thus, the diameter D of the deenergizing tank 7 is practically preferable to have a value equal to one and a half to twice the nominal diameter $d$ of the valve housing 3.

The length $l_3$ of the fixed sleeve 10 is preferable to be made as short as possible in order to make the loss of flow passing therethrough as small as possible. The present inventor has experimentally proved that the optimum length of the fixed sleeve 10 is about 70% of the nominal diameter $d$ of the valve housing 3.

Though the length L of the valve housing 3 obtained by adding the length $l_1$ from that end of the guide pipe 4 which is joined to the inlet pipe 1 to the rear or outlet pipe side end of the fixed sleeve 10 to the length $l_2$ of the one-way sloped pipe 8 is influenced by the length $l_3$ of the fixed sleeve 10 and the fluid outflow angle $\alpha$ defined by the inclined angle of each peripheral wall of the one-way sloped tube 8 and the casing 17, it is preferable to cause the ratio relative to the nominal diameter $d$ of the valve housing 3 to be reduced to a smaller value as said nominal diameter $d$ has a larger value, for the purpose of making the loss of fluid flow within the valve housing 3 as small as possible.

Where, thus, the aforesaid fluid outflow angle is about 20° to 30° and the length $l_3$ of the fixed sleeve 10 is equal to about 0.7 $d$, then the present inventor has experimentally proved that each value of the aforesaid $L_1$, $l_1$ and $l_2$ relative to various values of the aforesaid nominal diameter $d$ is preferable to be chosen to have a value as illustrated in the below table 2.

Table 2

| d(mm) | L(mm) | $l_1$(mm) | $l_2$(mm) |
|---|---|---|---|
| 250 | 3.7d | 2d | 1.7d |
| 300 | " | " | " |
| 350 | " | " | " |
| 400 | " | " | " |
| 450 | " | " | " |
| 500 | 3.3d | 1.8d | 1.5d |
| 600 | " | " | " |
| 700 | " | " | " |
| 800 | " | " | " |
| 900 | " | " | " |
| 1000 | 3.0d | 1.6d | 1.4d |
| 1100 | " | " | " |
| 1200 | " | " | " |
| 1350 | " | " | " |
| 1500 | " | " | " |

The operation of the sleeve valve constructed as mentioned above will now be described.

Firstly, it is assumed that the piston rod 20 of the cylinder 21 recedes at the rearmost position under control of the fluid pressure unit 23 in such a manner that its largest part enters into the cylinder 21 and the peripheral wall of the fixed sleeve 10 is entirely closed by the movable sleeve 9.

Under this condition, fluid incoming from the inlet pipe 1 enters through the guide pipe 4 into the fixed sleeve 10, but is dammed by the movable sleeve 9 and is not jetted into the deenergizing tank 7. When, under this condition, gradually increasing the projecting length of the piston rod 20 from the cylinder 21 by the action of the fluid pressure unit 23, then that the peripheral wall portion of the fixed sleeve 10 which includes the portion facing the inner sleeve 14 and in which the small taper holes 11 are perforated is first opened. As a result, fluid within the fixed sleeve 10 is jetted through the respective small taper holes 11 bored in the opened peripheral wall portion thereof into the deenergizing tank 7 as a speed defined by the speed of the fluid, the differential pressure between the upstream of the fixed sleeve 10 and the downstream thereof, and the frictional resistance of the opened taper holes 11, and is then flowed out through the one-way sloped pipe 8 toward the outlet pipe 2. When farther increasing the projecting length of the piston rod 20 from the cylinder 21 by the action of the fluid pressure unit 23, then that peripheral wall portion of the fixed sleeve 10 in which the large rectangular window or windows 12 are bored is opened together with all the small taper holes 11 of the fixed sleeve 10. As a result, fluid within the fixed sleeve 10 is jetted through the large rectangular window or windows 12 as well as the small taper holes 11 into the deenergizing tank 7, and is then flowed out through the one-way sloped pipe 8 toward the outlet pipe 2 at a speed defined in the same manner as the above-mentioned. For this reason, it will be apparent that the sleeve valve of the invention, installed in any fluid pipeline section, enables the amount of fluid flow which is jetted through the valve openings 11 and 12 bored in the peripheral wall of the fixed sleeve 10 into the deenergizing tank 7 and is then flowed out toward the outlet pipe 2 to be easily controlled by appropriately controlling the projecting length of the piston rod 20 from the cylinder 21 through the action of the fluid pressure unit 23.

Figure 5:
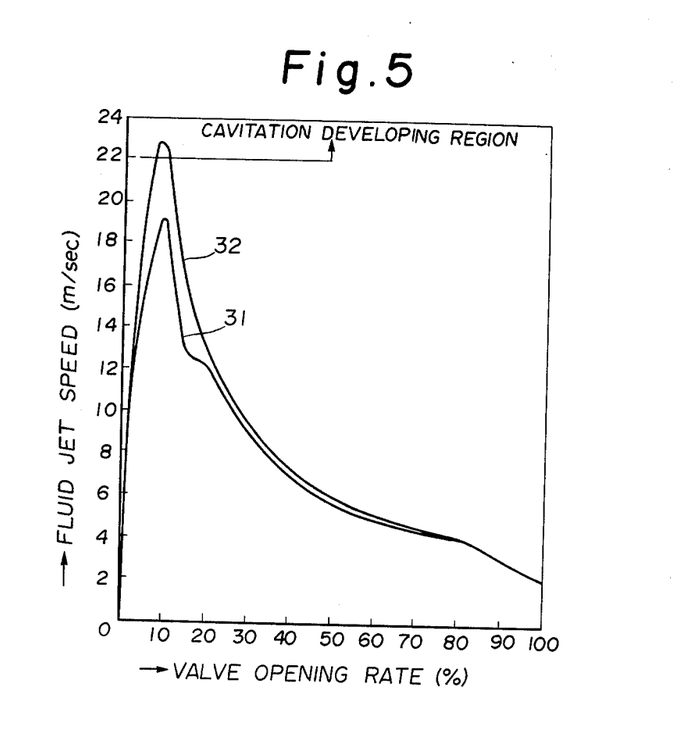
FIG. 5 shows curve diagrams illustrating the relationship of the valve opening rate versus the fluid jet speed from the opened opening section of the fixed sleeve, for each of the prior art sleeve valve and the sleeve valve of the invention.
Figure 6:
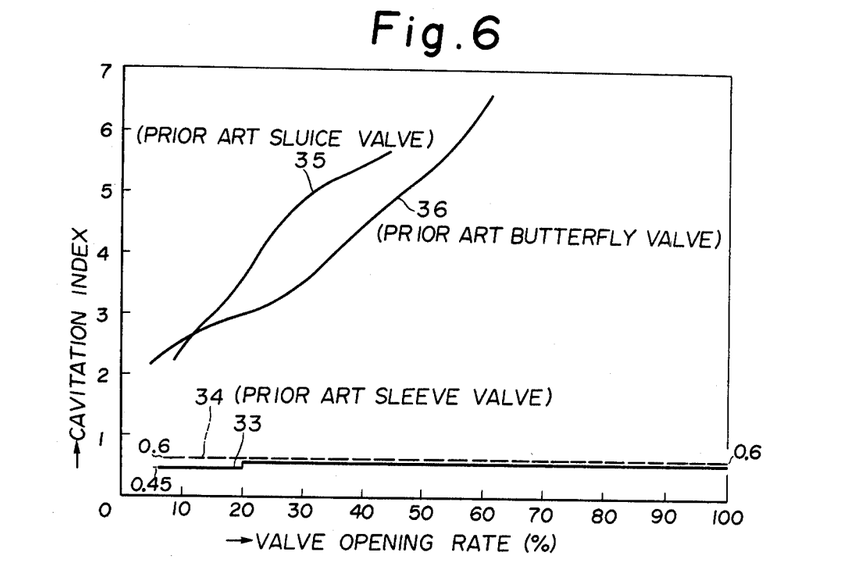
FIG. 6 shows curve diagrams illustrating the relationship between the valve opening rate and the cavitation index, for each of the prior art sluice, butterfly and sleeve valves.

Thus, the sleeve valve according to the invention is adapted to arrange the inner sleeve 14 of the above-mentioned construction within that initial valve opening portion of the fixed sleeve 10 at which the differential pressure between the upstream of the fixed sleeve 10 and the downstream thereof has the largest value and consequently the speed of fluid jetted through the openings or holes bored in the peripheral wall of the fixed sleeve 10 into the deenergizing tank 7 has the highest value, thereby enabling the fluid flow speed jetted through the openings 13 of the inner sleeve 14 and the openings 11 of the fixed sleeve 10 forming the aforesaid initial valve opening section into the deenergizing tank 7 to be reduced as shown by a curve 31 in FIG. 5 to a smaller value than that of the prior art sleeve valve as indicated by a curve 32 in FIG. 5, and in consequence enabling the cavitation index at its initial valve opening section to be reduced as shown by a curve 33 in FIG. 6 to a smaller value (about 0.45) than that (about 0.6) of the prior art sleeve valve as illustrated by a curve 34.

As a result, the fluid pipeline section constructed utilizing the sleeve valve of the invention has the advantage of being capable of easily preventing cavitation developed frequently at an initial valve opening section when employing the prior art sleeve valve from being produced.

As shown by a curve 34 in FIG. 6, the prior art sleeve valve has its cavitation index of about 0.6 over whole the valve opening range.

Curves 35 and 36 shown in FIG. 6 respectively shown the cavitation indexes of the prior art sluice and butterfly valves. As is apparent from these curves 35 and 36, the conventional sluice and butterfly valves respectively have the drawbacks that their cavitation indexes each have a larger value as the valve opening rate is increased as well as each having a considerably larger value of about 2.5 to 3.0 even at the initial valve opening section having the smallest value than that of the aforesaid sleeve valve.

Figure 7:
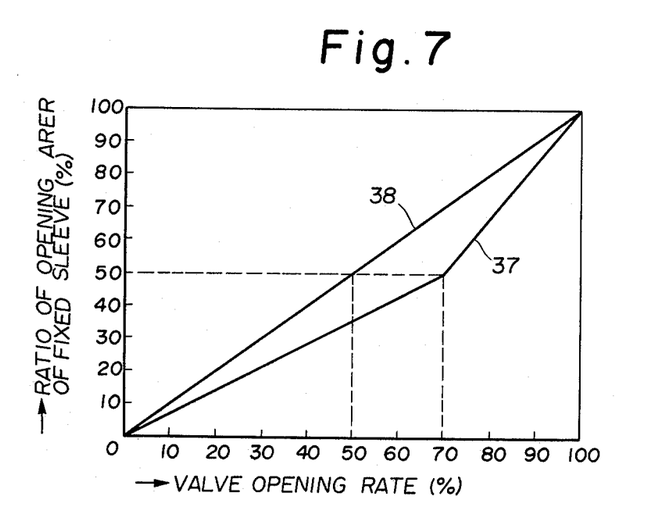
FIG. 7 shows curve diagrams illustrating the relationship of the valve opening rate versus the ratio of opening area bored in the peripheral wall of the fixed sleeve, for each of the prior art sleeve valve and the sleeve valve of the invention.
Figure 8:
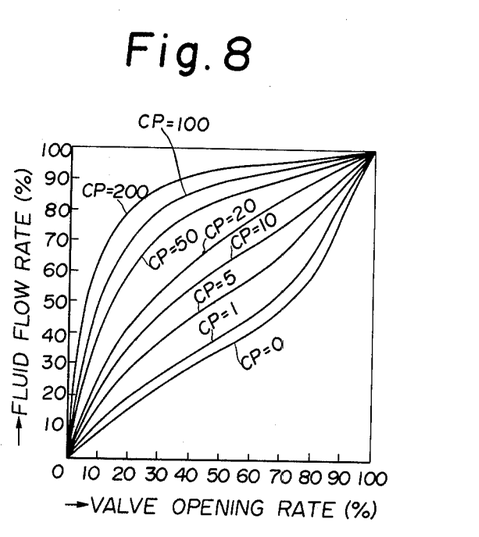
FIG. 8 shows curve diagrams illustrating the relationship between the valve opening rate and the fluid flow rate where the sleeve valve of the invention is installed in various fluid pipeline sections having different coefficients of pipe loss.

Further, in the sleeve valve of the invention, the aforesaid plurality of small taper holes 11 are perforated in only that peripheral wall portion of the fixed sleeve 10 which has about 70% of the whole of the length of the fixed sleeve 10 starting from the rear or outlet pipe side end, and the aforesaid one or more rectangular windows 12 are so bored in the remaining peripheral wall portion of the fixed sleeve 10 having about 30% length of whole the length thereof that their total upper surface opening area has substantially the same value as that of the respective small taper holes 11, as shown by a curve 37 in FIG. 7.

For this reason, the present inventor has experimentally proved that the sleeve valve of the invention has the advantage of being capable of attaining the most excellent possible flow control over the whole of the valve opening range even where it is installed in a fluid pipeline section having a considerably large coefficient of pipe loss of, e.g., about 200 as well as where it is installed in a fluid pipeline section having a relatively small coefficient of pipe loss.

On the contrary, the prior art sleeve valve in the whole of the peripheral wall of which only the aforesaid plurality of small taper holes are spirally perforated at a substantially equal pitch interval (see curve 38 shown in FIG. 7), has the drawback that the larger the coefficient of pipe loss of the fluid pipeline section where it is installed, the larger the change of the amount of fluid flow passing therethrough at its considerably small valve opening portion and consequently the amount of fluid flow passing therethrough over its largest remaining valve opening range is almost unchanged (see FIG. 9).

More particulaly, where the prior art sleeve valve of the aforesaid construction is installed in a fluid pipeline section having a relatively small coefficient of pipe loss such as less than about 20, then it can attain a considerably good fluid flow control, but, where it is installed in a fluid pipeline section having the coefficient of pipe loss of about 50, then about 90% fluid of whole the fluid to be flow controlled thereby is flowed out therethrough at its valve opening portion of about 20%, and where it is installed in a fluid pipeline section having the coefficient of pipe loss of about 200, then about 95% of the whole of the fluid to be flow controlled thereby is flowed out therethrough at its valve opening portion of about 20%.

Further, the sleeve valve of the invention is so arranged that the reciprocation of its movable sleeve 9 for moving the movable sleeve 9 along the length of its fixed sleeve 10 is not controlled directly from the outside of the fluid pipeline, but is conducted through the fluid pressure controlled type cylinder 21 within the fluid pipeline.

Therefore, the sleeve valve of the invention has the advantage of being capable of installing even in any fluid pipeline where the inlet pipe 1 is disposed coaxially with the outlet pipe 2 (see FIG. 1).

Figure 10:
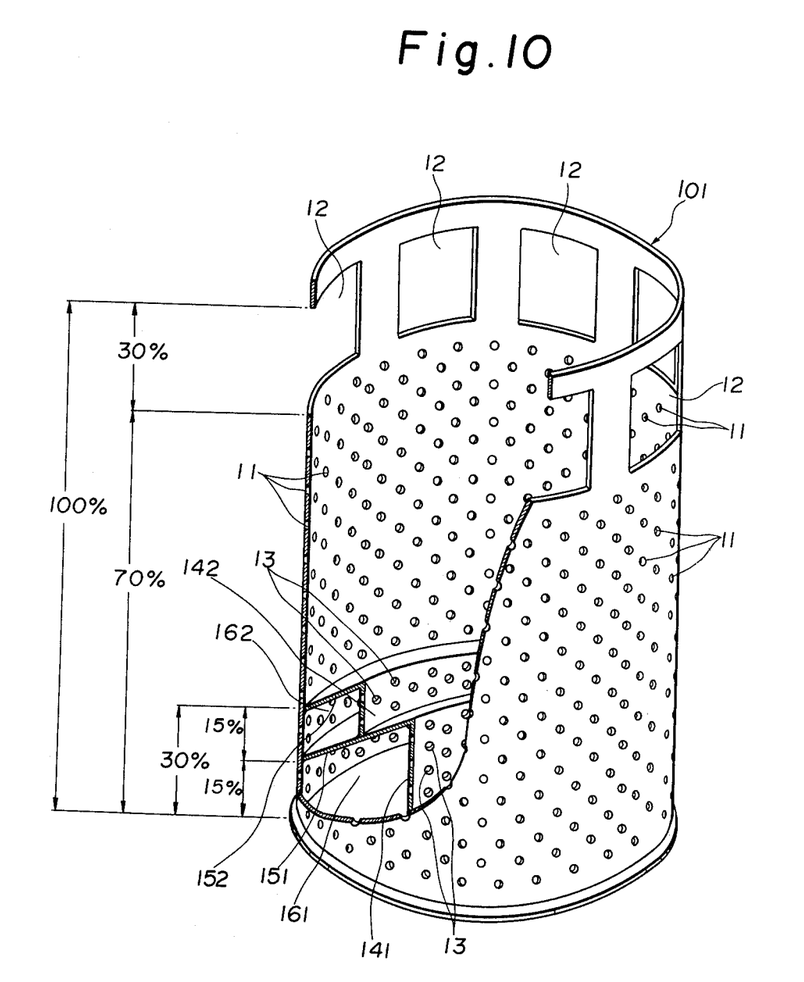
FIG. 10 is a partly broken away, perspective view of one modification of the fixed sleeve shown in FIGS. 1 and 4.

FIG. 10 is a partly broken away, perspective view of one modification of the fixed sleeve 10 shown in FIGS. 1 and 4.

The modified fixed sleeve 101 has the same construction as the fixed sleeve 10 shown in FIGS. 1 and 4, excepting that an inner sleeve to be arranged within the front or outlet pipe side thereof is constituted by a multi-stepped (in this example, two stepped) inner sleeves 141 and 142 respectively comprising hollow cylinders having both ends opened, substantially equal lengths and different diameters in place of the single inner sleeve 10 having a truncated conical hollow shape as shown in FIGS. 1 and 4.

Parts of FIG. 10 corresponding to those of FIG. 4 are designated by the same symbols and the description thereof is omitted.

Where, however, the multi-stepped inner sleeves 141 and 142 are used, it is required that the respective ring shaped partition plates 151 and 152 are so inclined as to have their different acute angles toward the rear or outlet pipe side end of the fixed sleeve 101, in order that the total opening area of the respective small taper holes 13 bored in the peripheral wall of each of the inner sleeves 141 and 142 has substantially the same value as that of the respective small taper holes 11 perforated in that peripheral wall portion of the fixed sleeve 101 which faces the corresponding inner sleeve 141 or 142.

It will be easily understood that the sleeve valve constructed utilizing the fixed sleeve 101 as shown in FIG. 10 can attain substantially the same effect as that 10 shown in FIGS. 1 and 4.

Figure 11:
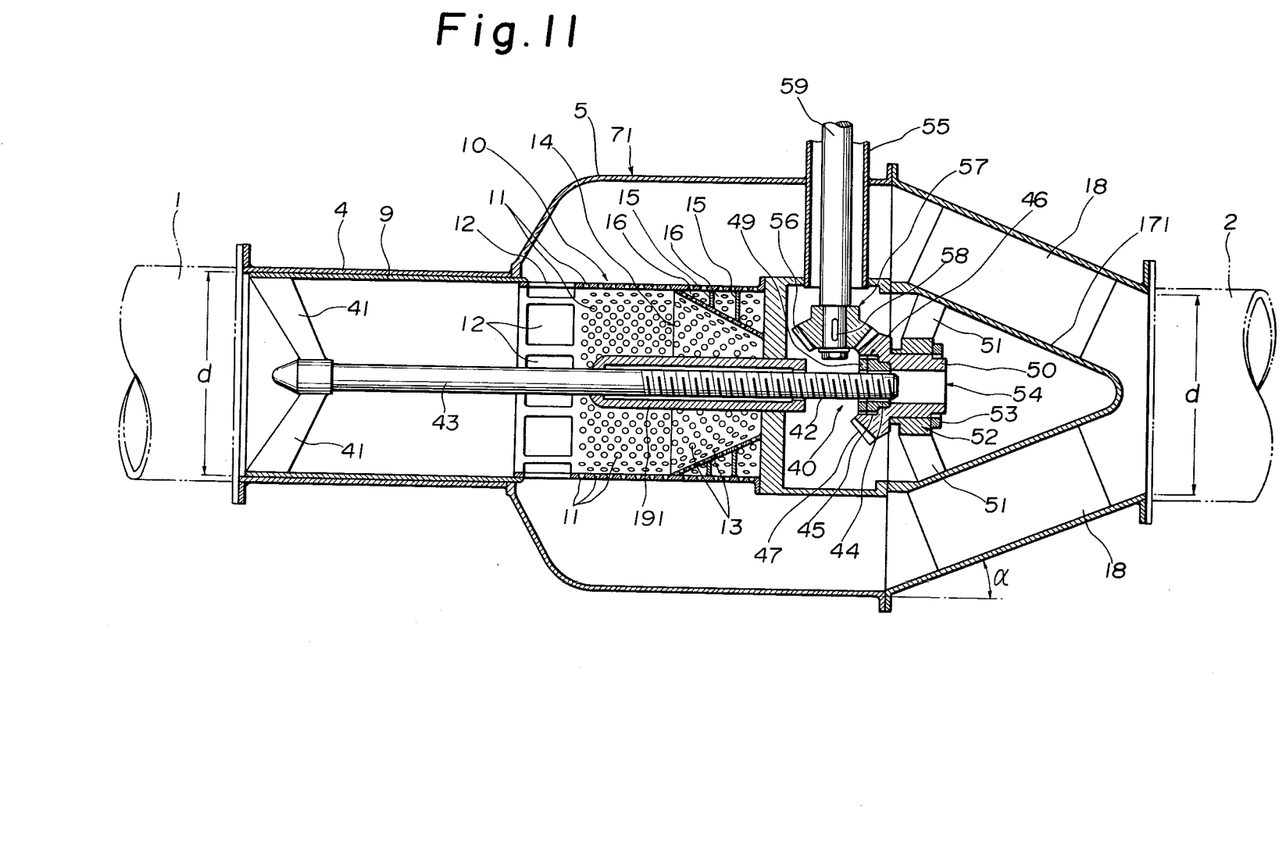
FIG. 11 is a schematic cross sectional view of a fluid pipeline section arranged employing a sleeve valve in accordance with another embodiment of the invention.

FIG. 11 is a schematic cross sectional view of a fluid pipeline section constructed utilizing a sleeve valve according to another embodiment of the invention.

The embodiment of FIG. 11 has the same construction as that of FIG. 1, excepting that means for reciprocating the movable sleeve 9 along the length of the fixed sleeve 10 is constituted by the hereinunder described gear assembly 40 in place of the fluid pressure controlled type cylinder 21 used in the embodiment of FIG. 1.

Namely, the gear assembly 40 comprises an elongated movement control rod 43 having its largest part arranged within the guide pipe 4, the fixed sleeve 10 and a casing 171 similar to the aforesaid cylinder casing 17 so as to align with their geometric centers and optionally reciprocate along the length thereof, having its front or inlet pipe side end portion secured through a plurality of plates 41 to the front or inlet pipe side inner wall portion of the movable sleeve 9, and formed with thread grooves 42 in its rear or outlet pipe side peripheral wall portion having the length substantially equal to the moving stroke of the movable sleeve 9; a nut 49 in the inner wall of which a female screw 44 threadably engaged with the thread grooves 42 of the movement control rod 43 is formed and in the outer peripheral wall of which a male screw 45 is threaded; a first bevel gear 54, having a cylindrical hollow shape with both ends opened, which includes a large diametric head portion 48 in the outer wall of which bevel teeth 47 are threaded and in the inner wall of which the nut 46 is fixedly screwed through a lock nut 49, and a small diametric rod like portion 50 extending integrally from the head portion 48 and on the peripheral wall of which a hollow cylinder 52 having a plurality of radially projected plates 51 secured to the inner wall of the casing 171 is fixed through a lock nut 53; and an elongated rotation control rod 59 which is rotatably arranged within and coaxially with a vertical hollow cylinder 55 having its lower end watertightly secured through a deenergizing tank 71 from the outside of the associated pipeline section to the casing 171, and on the lower peripheral wall of which a second bevel gear 57 is fixedly secured through a key 58, the second bevel gear 57 having a cylindrical hollow shape with both ends opened and having its outer wall threaded with bevel teeth 56 rotatably engaged with the bevel teeth 45 of the first bevel gear 54.

Parts of FIG. 11 corresponding to those of FIG. 1 are denoted by the same symbols and the description thereof is omitted.

It will be apparent that the gear assembly 40 of the above-mentioned construction can reciprocate the movable sleeve 9 in a similar manner to the fluid pressure controlled type cylinder 21 used in the embodiment of FIG. 1, by rotating the rotation control rod 59 in the clockwise or counterclockwise through an operator's hand or a motor.

It will be easily understood by those skilled in the art that the invention is not limited to the above-mentioned construction but is applicable to its various variations and modifications covering the technical concept of the invention.

For example, in the embodiments of FIGS. 1 and 11, the movable sleeve 9 and fixed sleeve 10 are adapted to be arranged within the valve housing disposed in the midway of a fluid pipeline section.

Figure 12:
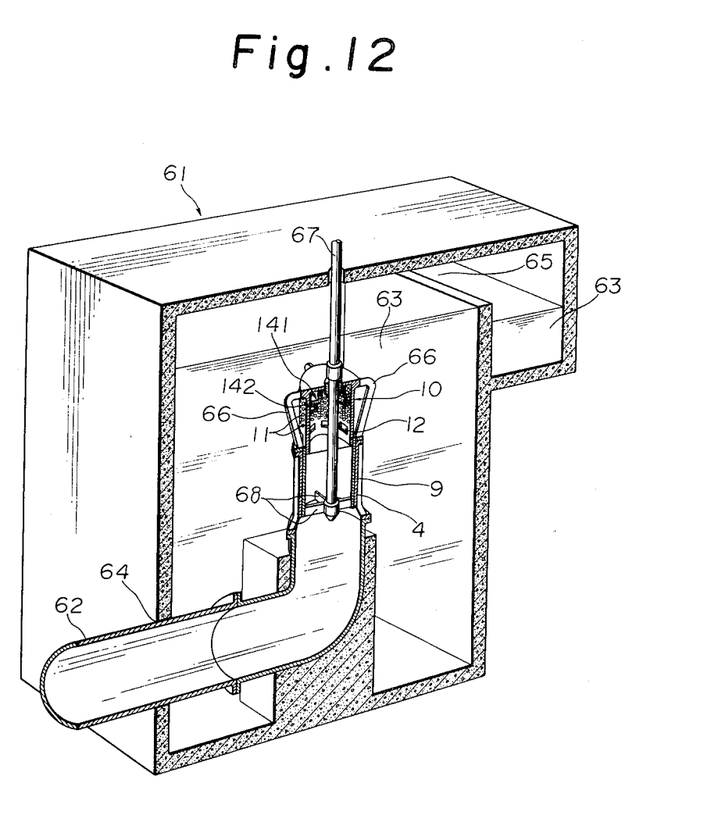
FIG. 12 is a cross sectional perspective view of another fluid pipeline section utilizing sleeve valve in accordance with the invention.

However, the movable sleeve 9 and fixed sleeve 10 may be adapted, as shown in FIG. 12, to be arranged within a hollow box shaped tank 61 joined to the end portion of a fluid pipeline 62 and allowing fluid 63 (in this example, water) after being flow controlled by the sleeve valve of the invention comprising the aforesaid movable sleeve 9 and fixed sleeve 10 to be contained therein.

The predetermined side (permissibly upper) wall of the tank 61 is bored with an aperture 64 for introducing the end portion of the pipeline 62 in the tank 61 and another side wall thereof is provided with a water overflowing window 65 (permissibly small outlet).

The tip portion of the pipeline 62 introduced in the tank 61 is vertically bent to join to the lower end of the guide pipe 4 which is vertically disposed at substantially the center of the tank 61 and within which the movable sleeve 9 is slidably mounted along its lengthwise direction. The fixed sleeve 10 is arranged on the upper end of the guide pipe 4 by means of support arms 66. Thus, an upwardly and downwardly movable elongated operation rod 67 is inserted in the tank 61 through the upper wall thereof with its lower end fixed through a plurality of narrow spaced plates 68 to the lower inner wall of the movable sleeve 9.

It will be apparent that the sleeve valve of the invention arranged, as shown in FIG. 12, within the tank 61 can appropriately control, in a similar manner as in the embodiments of FIGS. 1 and 11, the amount of flow of water 63 to be introduced through the pipeline 62 into the tank 61 and then overflowed through the window 65, by appropriately moving the operation rod 67 from the outside of the tank 61 in the upward or downward direction selectively to close the respective openings 11 and 12 bored in the peripheral wall of the fixed sleeve 10.

What is claimed is:

1. A sleeve valve installed in the midway or end portion of a fluid pipeline and comprising a fixed sleeve which has a cylindrical hollow shape with its inlet side end opened and its outlet side end closed and in the peripheral wall of which a plurality of openings are perforated; and a movable sleeve having a cylindrical hollow shape with both ends opened and optionally reciprocating toward and away from said fixed sleeve selectively to close the respective openings bored in the peripheral wall of the fixed sleeve, the improvement wherein an inner sleeve which has a cylindrical hollow shape with its inlet side end opened and in the peripheral wall of which a plurality of openings similar to those bored in the peripheral wall portion of said fixed sleeve facing said inner sleeve are perforated is arranged within said fixed sleeve coaxially therewith, one or more ring shaped partition plates being disposed at a substantially equal interval between the outer wall of said inner sleeve and that inner wall portion of said fixed sleeve which confronts said inner sleeve.

2. A sleeve valve claimed in claim 1, characterized in said inner sleeve comprises a truncated conical hollow cylinder having about 30% length of said fixed sleeve and formed to have such an inclined peripheral wall that the total outer surface opening area of the respective openings bored in that peripheral wall portion of said truncated conical hollow cylinder which is defined by each of said partition plates has substantially the same value as that of the respective openings bored in that peripheral wall portion of said fixed sleeve which is defined by the corresponding one of said partition plates.

3. A sleeve valve claimed in claim 1, characterized in that said inner sleeve comprises multistepped hollow cylinders totally having about 30% length of said fixed sleeve, having substantially the same length to each other, and formed to have such different diameters that the total outer surface opening area of the respective openings bored in the peripheral wall of each of said cylinders has substantially the same value as that of the respective openings bored in that peripheral wall portion of said fixed sleeve which is defined by the corresponding one of said partition plates and faces the corresponding one of said cylinders.

4. A sleeve valve claimed in claim 1, characterized in that said plurality of openings bored in the peripheral wall of said fixed sleeve are so formed that their total opening area per unit length at its inlet side has a larger value than that at the remaining fixed sleeve portion.

5. A sleeve valve claimed in claim 4, characterized in that the respective openings bored in the inlet side peripheral wall portion of said fixed sleeve comprise small holes perforated in a zigzag form at a pitch interval substantially equal twice the diameter of each of said small holes; and that the opening or openings bored in the remaining peripheral wall portion of said fixed sleeve comprise a large hole or holes having a fully larger size than that of each of said small holes.

6. A sleeve valve claimed in claim 5, characterized in that said large hole comprises a space defined by the front or inlet side end of said fixed sleeve and the rear or outlet side end of said movable sleeve.

7. A sleeve valve claimed in claim 5, characterized in that said small holes are perforated in that peripheral wall portion of said fixed sleeve which has about 70% length of said fixed sleeve starting from the rear or outlet side end; and that said large hole or holes are so bored in the remaining peripheral wall portion of said fixed sleeve having about 30% length thereof that their total outer surface area has substantially the same value as that of said small holes.

8. A sleeve valve claimed in claim 7, characterized in that said small holes each comprise a nozzle hole having its outer surface diameter, when taken the nominal diameter of a fluid pipeline section in which the sleeve valve is installed as $d$ and the pitch angle of said small holes as $\theta$, substantially equal to a value defined by a formula $(\tan \theta \cdot \pi d)/2$, and having its inner surface diameter formed at a taper angle of about 11°30' to have a larger value than said inner surface diameter.

9. A sleeve valve claimed in claim 1, characterized in that said fixed and movable sleeves are arranged within a valve housing joined to the midway of any fluid pipeline.

10. A sleeve valve claimed in claim 9, characterized in that the reciprocation of said movable sleeve along the length thereof is so arranged as to be not controlled directly from the outside of said valve housing but is conducted through an appropriate control device within said valve housing.

11. A sleeve valve claimed in claim 10, characterized in that said control device for reciprocating said movable sleeve along the length thereof comprises a fluid pressure controlled type cylinder.

12. A sleeve valve claimed in claim 10, characterized in that said control device for reciprocating said movable sleeve along the length thereof comprises a gear assembly.

13. A sleeve valve claimed in claim 10, characterized in that said valve housing comprises a cylindrical hollow shaped guide pipe having one end joined to the inlet end of said fluid pipeline, having both ends opened, and within which said movable sleeve is slidably mounted; a deenergizing tank within which said fixed sleeve is coaxially disposed, and which includes a cup shaped portion having its ring shaped bottom joined to the other end of said guide pipe and a hollow cylindrical portion extending from the upper circular edge of said cup shaped portion toward said fluid outlet end; a truncated hollow conical shaped one-way sloped pipe having its bottom edge joined to the edge of said hollow cylindrical portion of said deenergizing tank and its upper edge joined to the outlet end of said fluid pipeline.

14. A sleeve valve claimed in claim 13, characterized in that said guide pipe, deenergizing tank and one-way sloped pipe jointly constituting said valve housing are all arranged coaxially with the inlet and outlet of said fluid pipeline.

15. A sleeve valve claimed in claim 13, characterized in that said deenergizing tank has its diameter about one and a half to twice that of said fixed sleeve.

16. A sleeve valve claimed in claim 13, characterized in that the peripheral wall of said one-way sloped pipe has its inclined angle of about 20° to 30° with respect to the axis thereof.

17. A sleeve valve claimed in claim 13, characterized in that said guide pipe is so formed as to have its diameter substantially equal to the nominal diameter of said fluid pipeline and its length substantially equal to that of said movable sleeve.

18. A sleeve valve claimed in claim 1, characterized in that said fixed and movable sleeves are arranged within a hollow box shaped tank which is joined to the end portion of a fluid pipeline and in which fluid after being flow controlled by the sleeve valve is contained.

19. A sleeve valve claimed in claim 18, characterized in that said tank has an aperture bored in its predetermined wall to introduce therethrough the end portion of said fluid pipeline in said tank, and has a fluid outlet or overflowing window provided in its predetermined side wall.

20. A sleeve valve claimed in claim 18, characterized in that said movable sleeve is slidably mounted within a guide pipe with the lower end joined to the vertically bent end of said fluid pipeline disposed within said tank through the predetermined wall thereof, and in that said fixed sleeve is mounted on the upper end of said guide pipe so as to position coaxially with said guide pipe and movable sleeve.

21. A sleeve valve claimed in claim 20, characterized in that said movable sleeve is fixed through a plurality of narrow spaced plates to the lower end of an elongated reciprocatable operation rod inserted in said tank through the upper wall thereof, thereby selectively to close the respective openings bored in the peripheral wall of said fixed sleeve in accordance with the reciprocation thereof through said operation rod toward and away from said fixed sleeve.

* * * * *